United States Patent
Melle et al.

(10) Patent No.: US 9,720,511 B2
(45) Date of Patent: Aug. 1, 2017

(54) HAND AND OBJECT TRACKING IN THREE-DIMENSIONAL SPACE

(71) Applicant: Panasonic Intellectual Property Management Co., Ltd., Osaka (JP)

(72) Inventors: Andrea Melle, London (GB); David Kryze, Mountain View, CA (US); Yue Fei, San Jose, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 380 days.

(21) Appl. No.: 14/594,554

(22) Filed: Jan. 12, 2015

(65) Prior Publication Data

US 2015/0124086 A1  May 7, 2015

Related U.S. Application Data

(63) Continuation of application No. PCT/JP2013/004307, filed on Jul. 12, 2013.
(Continued)

(51) Int. Cl.
  *H04N 5/225* (2006.01)
  *G06F 3/01* (2006.01)
  (Continued)

(52) U.S. Cl.
  CPC ............ *G06F 3/017* (2013.01); *G01B 11/002* (2013.01); *G01B 11/2433* (2013.01);
  (Continued)

(58) Field of Classification Search
  CPC ....... G06T 7/507; G06T 7/521; G01B 11/002; G01B 11/2433; G01B 11/25; G01S 3/7864; G06F 3/011; G06F 3/0317
  (Continued)

(56) References Cited

U.S. PATENT DOCUMENTS 6,775,014 B2   8/2004  Foote et al.
7,263,217 B2   8/2007  Kawaike et al.
(Continued)

FOREIGN PATENT DOCUMENTS

JP   2002-213947 A   7/2002
JP   2003-269915 A   9/2003
(Continued)

OTHER PUBLICATIONS

Prieto, Abraham, et al., "An Adaptive Visual Gesture Based Interface for Human Machine Interaction in Intelligent Workspaces," Proceedings of 2006 IEEE International Conference on Virtual Environments, Human-Computer Interfaces, and Measurement Systems, La Coruna, Spain, Jul. 10-12, 2006, pp. 43-48.
(Continued)

*Primary Examiner* — Helen Shibru
(74) *Attorney, Agent, or Firm* — Harness, Dickey & Pierce, P.L.C.

(57) ABSTRACT

A hybrid system which detects and tracks objects in three-dimensional space using a light source disposed in spaced relation to a projection surface, defining a volume of space illuminated by said light source. A light sensor responsive to illumination falling on the projection surface measures illumination levels over a predefined image plane associated with the light sensor, producing a projected image signal. A structured light source projects a structured light within the volume of space and a structured light sensor records reflected structured light from objects occupying the volume of space producing a structured light signal. A correlation processor receptive of the projected image signal and said structured light signal and adapted to compute a hybrid signal indicative of the position of an object within said space and from which other information about the object may be extracted.

25 Claims, 9 Drawing Sheets

Related U.S. Application Data

(60) Provisional application No. 61/671,134, filed on Jul. 13, 2012.

(51) Int. Cl.

| | | |
|---|---|---|
| *G01B 11/00* | (2006.01) | |
| *G01B 11/24* | (2006.01) | |
| *G01B 11/25* | (2006.01) | |
| *G01S 3/786* | (2006.01) | |
| *G06F 3/03* | (2006.01) | |
| *G06T 7/507* | (2017.01) | |
| *G06T 7/521* | (2017.01) | |
| *G01S 17/87* | (2006.01) | |

(52) U.S. Cl.
CPC ............ *G01B 11/25* (2013.01); *G01S 3/7864* (2013.01); *G06F 3/011* (2013.01); *G06F 3/0317* (2013.01); *G06T 7/507* (2017.01); *G06T 7/521* (2017.01); *G01S 17/87* (2013.01); *G06T 2207/30196* (2013.01)

(58) Field of Classification Search
USPC ....... 348/169, 135, 208.14, 42, 48; 345/174; 382/103, 118
See application file for complete search history.

(56) References Cited

U.S. PATENT DOCUMENTS

| | | | |
|---|---|---|---|
| 8,854,802 B2 | 10/2014 | Robinson et al. | |
| 9,454,278 B2* | 9/2016 | Keppel | G06F 3/0418 |
| 9,507,470 B2* | 11/2016 | Jung | G06F 3/044 |
| 9,529,428 B1* | 12/2016 | Bhattacharya | G06F 3/012 |
| 2002/0093666 A1 | 7/2002 | Foote et al. | |
| 2003/0235331 A1 | 12/2003 | Kawaike et al. | |
| 2004/0041996 A1 | 3/2004 | Abe | |
| 2009/0304232 A1* | 12/2009 | Tsukizawa | A61B 3/113 |
| | | | 382/103 |
| 2011/0096072 A1 | 4/2011 | Kim et al. | |
| 2011/0205341 A1 | 8/2011 | Wilson et al. | |
| 2012/0098761 A1 | 4/2012 | Mitchell et al. | |
| 2012/0098806 A1 | 4/2012 | Samadani et al. | |
| 2012/0099250 A1 | 4/2012 | Robinson et al. | |
| 2012/0102438 A1 | 4/2012 | Robinson et al. | |
| 2012/0102439 A1 | 4/2012 | Mitchell et al. | |
| 2012/0262365 A1* | 10/2012 | Mallinson | G01S 1/725 |
| | | | 345/156 |
| 2013/0091462 A1* | 4/2013 | Gray | G06F 3/0346 |
| | | | 715/810 |
| 2013/0207896 A1 | 8/2013 | Robinson et al. | |
| 2014/0267771 A1* | 9/2014 | Lawler | G06K 9/00597 |
| | | | 348/169 |
| 2015/0015528 A1* | 1/2015 | Vandermeijden | G06F 3/0416 |
| | | | 345/174 |
| 2015/0015539 A1* | 1/2015 | Fotopoulos | G06F 3/0416 |
| | | | 345/174 |
| 2015/0156803 A1* | 6/2015 | Ballard | G02B 27/017 |
| | | | 455/422.1 |

FOREIGN PATENT DOCUMENTS

| | | |
|---|---|---|
| WO | 2011/066916 A1 | 6/2011 |
| WO | 2012/054063 A1 | 4/2012 |

OTHER PUBLICATIONS

Van den Bergh, Michael, et al., "Combining RGB and ToF Cameras for Real-time 3D Hand Gesture Interaction," 2011 IEEE Workshop on Applications of Computer Vision (WACV), Jan. 5, 2011, pp. 66-72.

Segen, Jakub, et al., "Shadow Gestures: 3D Hand Pose Estimation using a Single Camera," Proceedings of the 1999 IEEE Computer Society Conference on Computer Vision and Pattern Recognition, Jun. 23-25, 1999, Fort Collins, Colorado, vol. 1, pp. 479-485.

International Search Report and Written Opinion of the International Searching Authority, Application No. PCT/JP2013/004307, Oct. 18, 2013.

* cited by examiner $d = \sqrt{(z_2-z_1)^2 - l^2}$

HAND AND OBJECT TRACKING IN THREE-DIMENSIONAL SPACE

CROSS REFERENCE TO RELATED APPLICATIONS

This is a continuation application of PCT International Application No. PCT/JP2013/004307 filed on Jul. 12, 2013, designating the United States of America, which is based on and claims priority of U.S. Patent Application No. 61/671,134 filed on Jul. 13, 2012. The entire disclosures of the above-identified applications, including the specifications, drawings and claims are incorporated herein by reference in their entirety.

FIELD

The present disclosure relates to tracking and extracting information from objects, such as the hand of a user, in three-dimensional space using optical sensors. More particularly, the disclosure relates to a hybrid tracking system that uses both structured light and shadow-projection light to capture position and orientation information.

BACKGROUND

This section provides background information related to the present disclosure which is not necessarily prior art.

Structured light involves projecting a known pattern of pixels onto an object and then viewing the light reflected from that object to detect and measure the features of the object such as its position and orientation. The structured light pattern might be, for example, a grid of lines or dots projected into a space, which become displaced when an object enters the space. The Kinect (Registered Trademark) system popularized by Microsoft Corporation represents an example of a structured light sensing system.

CITATION LIST

Patent Literature

[PTL 1] Japanese Unexamined Patent Application Publication No. 2003-269915
[PTL 2] Japanese Unexamined Patent Application Publication No. 2002-213947

SUMMARY

Technical Problem

While structured light sensing systems are proving to be quite useful in a variety of applications, they exhibit a basic problem in that the structured light emanates effectively from a point source so that the light rays radiate outwardly from the source. Resolution is a function of grid dimension; and grid dimension expands as the pattern radiates outwardly from the source. Thus the resolution accuracy of a conventional structured light system suffers the farther the target is from the light source.

Solution to Problem

This section provides a general summary of the disclosure, and is not a comprehensive disclosure of its full scope or all of its features.

The disclosed tracking system addresses deficiencies in structured light sensing systems by providing a hybrid sensing technique that uses a structured light sensing system and a shadow-projecting or image-projecting light sensing system and includes a processor programmed to correlate the signals from the two sensing systems. The structured light sensing system and a shadow-projecting light sensing system are disparate systems that operate on different sensing principles. Advantageously, the properties of the respective systems are such that their resolutions are not interdependent. Indeed, in one embodiment, the resolution of the shadow—projecting light sensing system actually increases as the sensed object moves farther from the light source— the exact opposite of the resolution performance experienced by the structured light sensing system.

One disclosed embodiment employs a projection surface, with a light source disposed in spaced relation to said projection surface. The projection surface and the light source define a volume of space illuminated by the light source. A light sensor responsive to illumination falling on the projection surface measures illumination levels over a predefined image plane associated with the light sensor, producing a projected shadow signal.

In addition to the shadow-projection system, there is provided a structured light source that projects a structured light within the volume of space. The structured light will typically emanate in a diverging pattern that defines a resolution that decreases with increasing distance from the structured light source. A structured light sensor records in memory reflected structured light from objects occupying the volume of space producing a structured light signal.

The disclosed system includes a correlation processor receptive of the projected shadow signal and said structured light signal. The processor, which may be implemented using a programmed microprocessor, digital signal processor, or dedicated application-specific integrated circuit, is adapted to compute a hybrid signal indicative of the position of an object within said space.

Further areas of applicability will become apparent from the description provided herein. The description and specific examples in this summary are intended for purposes of illustration only and are not intended to limit the scope of the present disclosure.

Advantageous Effects

The disclosed tracking system can improve the resolution accuracy of the target far from the light source.

BRIEF DESCRIPTION OF DRAWINGS

These and other objects, advantages and features of the invention will become apparent from the following description thereof taken in conjunction with the accompanying drawings that illustrate a specific embodiment of the present disclosure.

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF EMBODIMENTS

Examples of non-limiting embodiments will now be described more fully with reference to the accompanying drawings.

Embodiment 1

Figure 1:
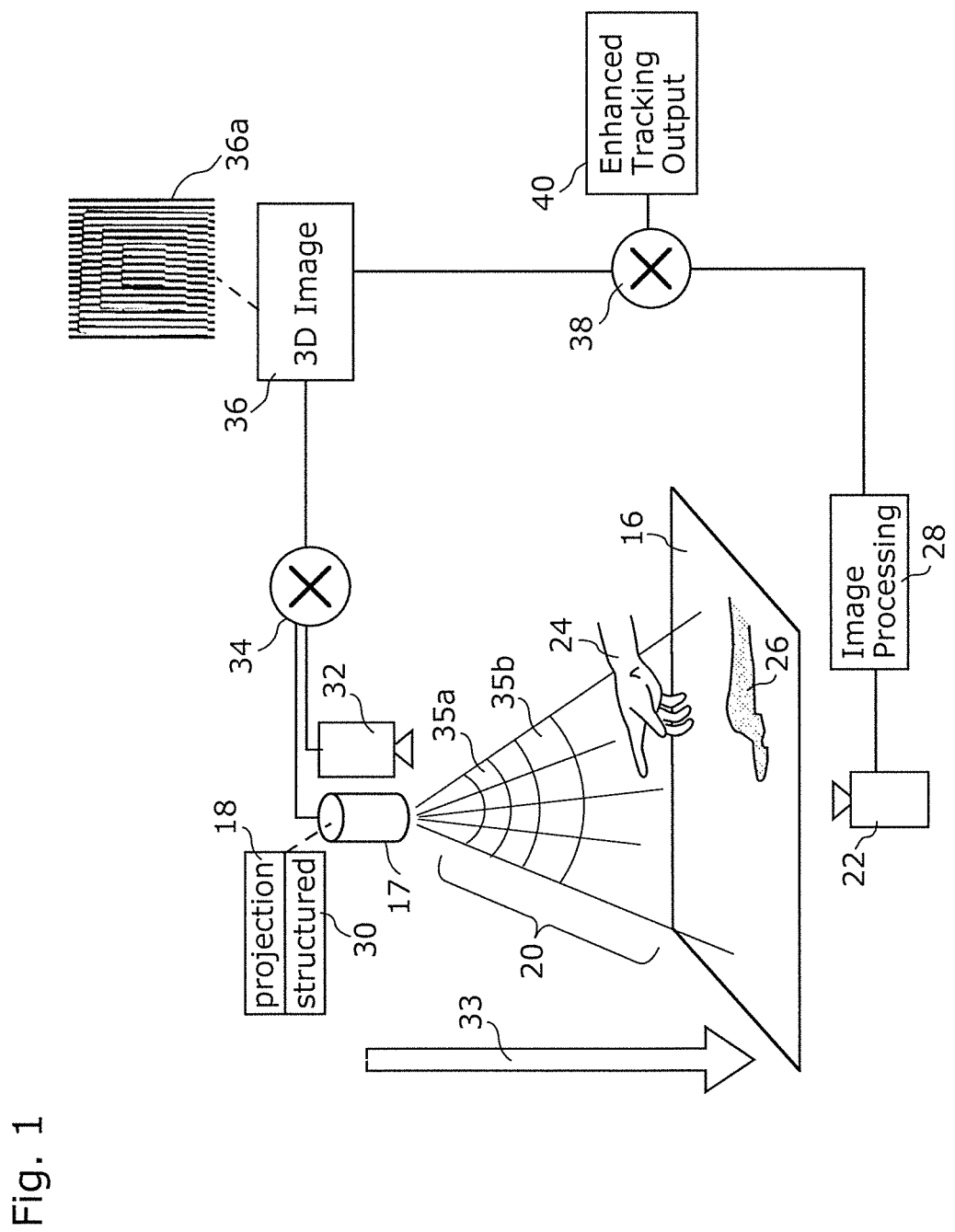
FIG. 1 is a block diagram showing a hybrid system for tracking objects in three-dimensional space.

Referring to FIG. 1, an exemplary hybrid system for tracking an object in three-dimensional space utilizes a projection surface 16 with a light source 18 disposed in spaced relation to surface 16 to define a volume of space 20 that is illuminated by the light source 18. The hybrid system uses two sensing systems: a projection sensing system (e.g., a shadow-projection system) and a structured light sensing system. Each of these sensing systems may use its own light source, optimized for that system. If desired, these separate light sources can be packaged within or implemented by a common unit. Thus FIG. 1 illustrates generally an illumination source 17. It will be understood that this illumination source may contain or function as the light source 18, and also contain or function as a structured light source (described below as structured light source 30), depending on how the system is configured.

A light sensor 22 is disposed beneath the projection surface 16, namely, on the opposite side from the light source 18, so that it is responsive to illumination falling on the protection surface 16 and is operative to measure illumination levels over a predefined image plane associated with the light sensor. In other words, light sensor 22 responds primarily to light from light source 18 falling onto and being transmitted through the projection surface to measure shadows cast on the surface by objects disposed within the volume of space 20. In FIG. 1, a hand 24 is placed within the volume of space and casts a shadow 26 which is then observed by and recorded by the light sensor 22 to generate a projected image (e.g., shadow) signal or data that is fed to image processing circuitry 28.

The apparatus further includes a structured light source 30 that projects a structured light within the volume of space 20. If desired, the light source 18 and the structured light source 30, shown collectively as illumination source 17, can be implemented using a single illumination system where the light from light source 18 and structured light from structured light source 30 are differentiated from one another through time multiplexing or wavelength multiplexing. In a time-multiplexed embodiment, the light source alternates between a constant illumination and a structured light illumination. In a wavelength-multiplexed system, a constant light is projected at a first wavelength and a structured light is projected at a second wavelength. Other techniques for differentiating between the shadow casting light source 18 and the structured light source 30 are also possible.

The structured light source 30 is read by a structured light sensor 32 that is positioned and adapted to record reflected structured light from objects occupying the volume of space 20. The structured light sensor produces a structured light signal or data that is supplied to a correlator 34 and then to the 3D image processing circuitry 36. The correlator 34 may also be coupled to the structured light source 30 to allow the structured light source as projected to be compared with the structured light as reflected from objects placed within the volume of space 20. Correlator 34 may be implemented using a suitably programmed microprocessor, digital signal processor, or dedicated application-specific integrated circuit While there are a variety of different structured light implementations possible, a typical structured light pattern will comprise a geometric grid of equally spaced dots or grid lines that emanate outwardly from the point of origin. Because the structured light typically emanates from a point, the spatial resolution decreases in the direction shown by arrow 33 as objects within the volume of space 20 move away from the light source. This is also illustrated by comparing the grids 35a and 35b. As shown, the grid size increases with increasing distance, thus reducing the resolution. By comparison, the shadow 26 cast upon projection surface 16 is measured using the two-dimensional coordinates of the light sensor 22. Because the projection surface 16 lies in a plane generally optically parallel to the sensor 22 (sensor 22 may have, for example, a CCD array embedded therein, where the plane of the array is optically parallel to the surface 16). Thus, while the size of shadow 26 may increase or decrease as the object (hand 24) moves closer to or away from plane 16, the measuring resolution of light sensor 22 does not change with distance. As will be seen in the embodiment shown in FIG. 2, mirrors or prisms may be used to place the sensor's sensing surface in an optically parallel relation to the projection surface.

While the structured light sensor 32 and optical sensor 34 are both measuring position of an object within space 20, the reference frames and geometric properties of the respective measuring systems are not the same. This difference is actually an advantage because the respective systems can be mathematically correlated so that measuring errors or resolution deficiencies within one system are actually compensated for by the other. Intuitively, one can see that when the object (hand 24) is close to surface 16, the shadow cast will be quite precise (little fringing due to diffusion) and thus the light sensor 22 is able to capture a precise two-dimensional position in its reference space notwithstanding that the resolution from structured light sensor 32 is degraded due to distance. Conversely, when the hand is held close to sensor 32, a more accurate 3D positional reading is obtained from the structured light sensor, whereas the shadow 26 cast on the projection surface 16 may be somewhat less precise due to diffusion fringing. Thus, the two position-measuring systems complement one another, one providing higher resolution when the other is suffering from poor resolution, and vice versa.

Actual correlation of the respective signals is performed by correlator 38, which may supply an enhanced tracking output that may be stored in memory 40 for use by other systems, as will be described.

Each of the respective inputs to correlator 38 is processed by respective image processing circuitry 28 and 36 to generator positional information with respect to a common reference frame. Image processing circuitry 28 processes the raw data from light sensor 22 to define a shape corresponding to shadow 26.

Generally, there is a measurable luminosity difference between the projected shadow and the remainder of the illuminated projection surface 16. Depending on the distance of the object from the light source, there may be a reduced luminosity difference around the periphery of the shadow due to optical diffusion. In other words, the shadow will be substantially dark in the center, but may have a less dark (fuzzy) periphery where some of the light rays bend around the edges of the object. This is compensated for by the image processing circuitry by applying a contrast increasing algorithm and by performing edge detection to generate a two-dimensional contour representing the outline of the shadow 26. Because the diffusion fringing effect is dependent on distance from light source, if desired, the image processing circuitry can use this information to infer object position in the third dimension (outwardly from plane of surface 16). This may be accomplished by quantifying the degree of fringing effect. An object placed directly on surface 16 will have a sharp contour edge with no fringing, whereas an object placed near the light source will have a large fringing region.

By analyzing the size and tonal differences around the periphery of the cast shadow 26, the image processing circuitry 28 calculates a numeric value indicative of relative distance from the surface 16. To enhance this third-dimension resolving capability, it is best to use a projection light source that can be discriminated from other ambient light sources within the room where the apparatus is located. This may be accomplished, for example, by employing a wavelength of projected light that is not prevalent in room lighting systems, or by modulating the projected light of a characteristic signal not found in ambient lighting systems.

If desired, the image processing circuitry 28 may use the third-dimension information it has obtained to compensate for parallax error caused by differences in the angle of the incidence at different locations on the projection surface. At positions on the surface directly below the light source, incident light rays are perpendicular to the surface, whereas at the outer boundaries of the surface, incident light rays strike at a non-perpendicular angle. Thus, the relating shadow cast by an object within the space 20 will fall on the projection surface with some varying degree of parallax error, depending on how far out of perpendicular the incident light rays happen to be. Thus, as the object moves farther away from the projection surface, the shadow cast will begin to increase in size but with a distortion that depends on angle of incidence at the object's boundary.

The 3D image processing circuitry 36 performs the different function of determining the three-dimensional position of an object based on its contours. In this regard, the structured light pattern has a predefined appearance when viewed by structured light sensor 32. When an object is placed with space 20, certain regions within the field of view of sensor 32 will be perturbed due to the presence of the object causing certain structured light elements to be reflected from the object. These perturbations are treated as offsets from the standard structured light pattern. By way of illustration, a structured light pattern reflecting from a series of stacked blocks is shown at 36a in FIG. 1. Note how the structured light lines are offset where the edges of the blocks appear.

The 3D image processing circuitry 36 converts the raw reflected structured light data into 3D object contour data with associated position and rotation information (x, y, z, yaw, pitch, roll). These positional and rotational data points are also transformed (if necessary) to move the data to a reference frame shared with image processing circuitry 28. In other words, the data from the respective image processing circuitry 28 and 36 are placed in the same reference frame so that the correlator 38 can correlate points in space generated by image processing circuitry 28 with the corresponding points in space generated by 3D image processing circuitry 36.

Figure 2:
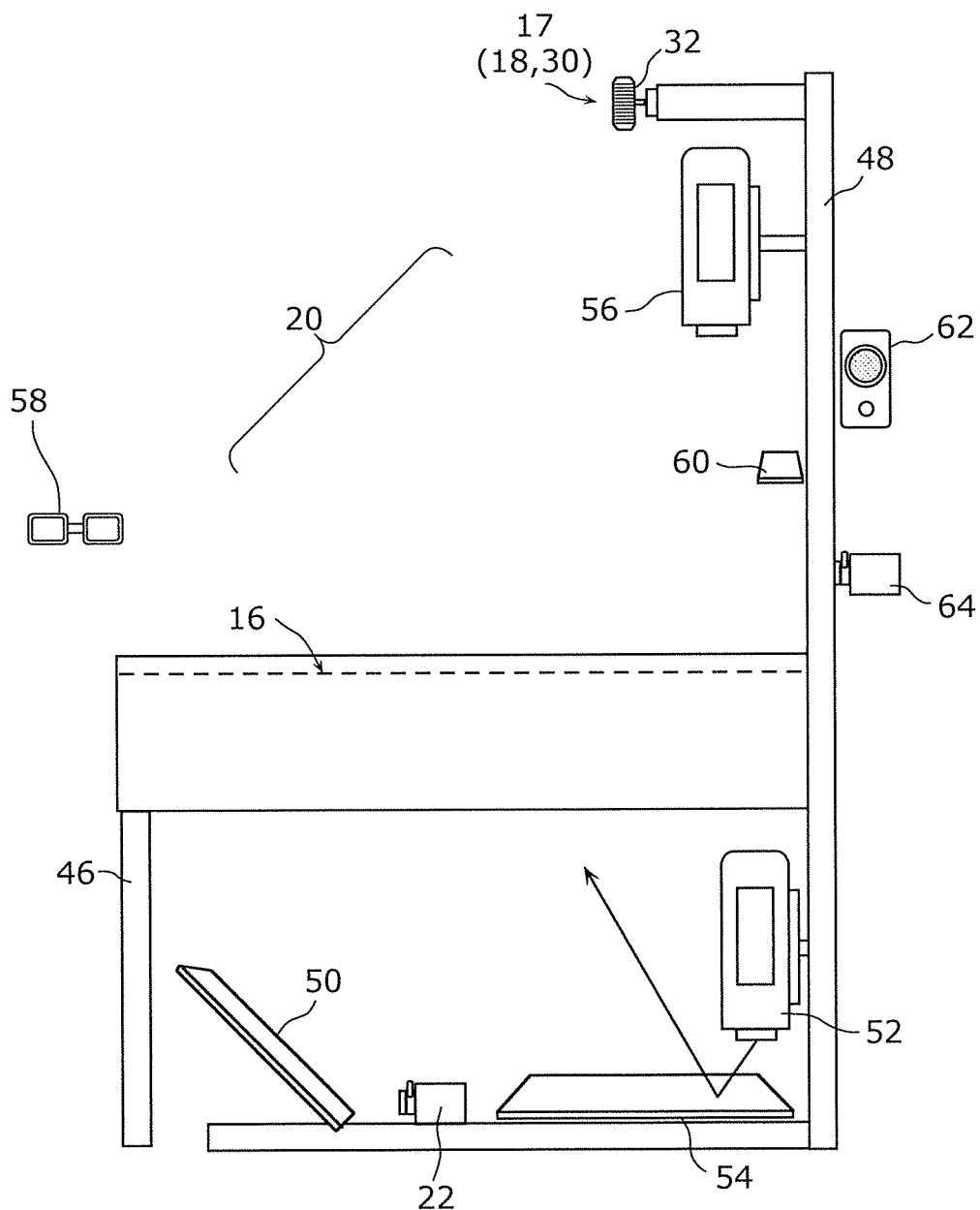
FIG. 2 illustrates the hybrid system deployed in a table system allowing users to see and manipulate virtual three-dimensional objects.

The system depicted in FIG. 1 defines a hybrid system where objects within the volume of space 20 are tracked using two disparate but correlated sensing systems. The hybrid technique may be applied in a multitude of different applications. An exemplary application will now be described in connection with FIG. 2. FIG. 2 depicts a 3D table system with which users view virtual three-dimensional objects and manipulate those objects by hand movements and gestural commands within the three-dimensional space above the table.

The basic components of the 3D table system will now be described. The 3D table comprises a frame 46 into which the projection surface 16 is mounted. The frame includes a suitable column 48 onto which is mounted the illumination source 17 (containing both the functionality of light source 18 and structured light source 30) and the structured light sensor 32. The light sensor 22 is mounted beneath the projection surface 16 and may be trained on the underside of the projection surface 16 by a suitable mirror 50. The structured light sensor 32 and the light sensor 22 thus observe the volume of space 20 from their respective vantage points.

To allow a user to view virtual three-dimensional objects within space 20, at least one and optionally multiple 3D projectors are provided. 3D projector 52 is disposed beneath the projection surface 16 and projects an image onto the underside of projection surface 16 via a mirror 54. A second 3D projector 56 is mounted on column 48 to project images onto the upper surface of the projection surface 16. Both 3D projectors are preferably equipped with image correction optics so that the images projected onto the surface 16 appear without distortion, notwithstanding the fact that the projector is not necessarily aimed at the center of the surface.

The 3D projectors are designed to work with 3D glasses 58. These glasses work by providing a different image to each of the left and right eyes. While there are a variety of different technologies for producing the 3D effect, the illustrated embodiment employs 3D glasses using a shutter technology whereby the left and right lenses are alternatively toggled on and off in synchronism with the projection of separate left and right images from the 3D projectors. Thus, the illustrated embodiment includes a shutter synchronizing circuit 60 that is connected to the 3D projectors 52 and wirelessly connected to the glasses 58. The wireless connection may be implemented using Bluetooth or other suitable wireless communication protocol. If desired, a speaker system 62 may also be installed on the frame to provide audible feedback as part of the 3D experience.

The 3D glasses 58 are designed to include head tracking sensors that are monitored by a head tracking system 64. In a preferred embodiment, the glasses 58 are equipped with reflective surfaces disposed on the eyeglass frame, which create a geometric pattern that can be monitored by the head tracking system 64. The head tracking system emits illumination such as infrared illumination that is reflected from the reflective surfaces from the glasses and then observed by infrared photo sensors located in the head tracking system. Because the geometric arrangement of the reflective surfaces on the glasses frame is fixed, the changes in reflective infrared light patterns as the user moves his or her head can be geometrically translated into user head position or user eye position data. By knowing the user head position or eye position data, the images fed to the 3D projector are adjusted to make slight alterations to the projected information for the respective left or right eyes. Doing so ensures that a realistic 3D effect is observed regardless of the user's current head or eye position.

In use, the user views images projected onto the projection surface 16 using the 3D glasses. The 3D effect makes objects appear to be floating above the projection surface 16 within the volume of space 20. The user, seeing a virtual 3D object within space 20, may reach out and manipulate that object with his or her hand. As the user's hand enters the volume of space 20, the two disparate position-sensing systems track the user's hand and extract information from the data to infer not only position but also orientation and optionally additional information such as whether the hand is open or closed, whether one or more fingers are extended, and the like. By coordinating the projected 3D images with the sensed hand position, the user is given the virtual experience of actually manipulating the object in 3D space. If the user grasps the object in his or her hand and then moves the hand, the object follows as if it were a physical object. In addition to manipulating the object as if it were a real object, the 3D tracking system can also respond to other types of gestural movements as will be described more fully below.

Figure 3B:
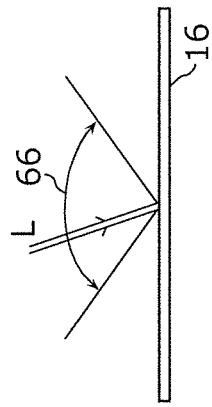
FIG. 3B illustrates how incident light is reflected from and projected through the projection surface.
Figure 3C:
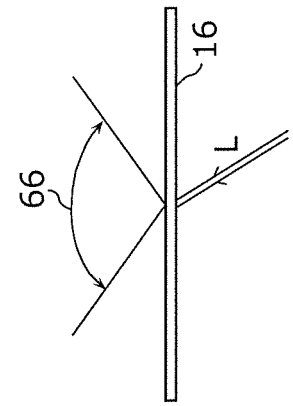
FIG. 3C illustrates how incident light is reflected from and projected through the projection surface.
Figure 3A:
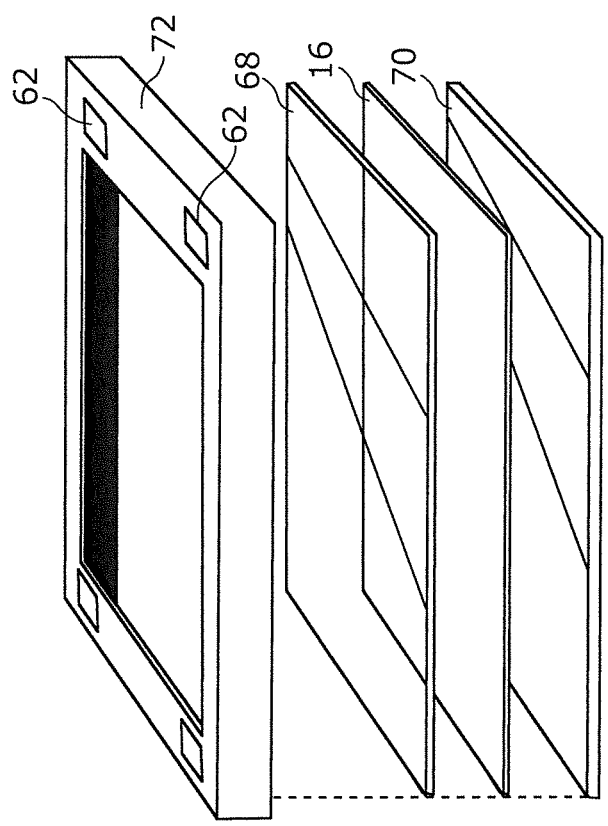
FIG. 3A is an exploded perspective view of the projection surface incorporated into a frame.

The projection surface 16 is preferably designed to provide a wide field of view for incident light reflected both from above and below the surface. A suitable embodiment of this surface is illustrated in FIGS. 3A-3C. The actual reflective surface is preferably both reflective and translucent to allow incident light L projected from above as shown in FIG. 3B and incident light L projected from below as shown in FIG. 3C to be viewed over a wide dispersion angle 66. While a variety of different materials are suitable for this purpose, the illustrated embodiment employs a vinyl fabric or film sheet as the projection surface 16. This sheet is sandwiched between a top acrylic layer 68 and a bottom acrylic layer 70. The sandwiched layers are then mounted in a suitable frame 72 which may include individual speaker elements of the speaker system 62. The frame may be fabricated from plywood or other suitable material to help disperse thermal heating caused by the 3D projectors. The bottom acrylic layer 70 is preferably fabricated from a sturdy, rigid transparent layer to ensure that the projection surface 16 remains flat. The top acrylic layer is preferably treated with an anti-reflective coating so that minimal reflection or glare is projected to the users. The resulting projection surface 16 thus serves the dual purpose of a projection surface for displaying images from the 3D projectors and also a transmissive surface that allows cast shadows to be observed by light sensor 22 and thus capture information about the user's hand position.

Figure 4:
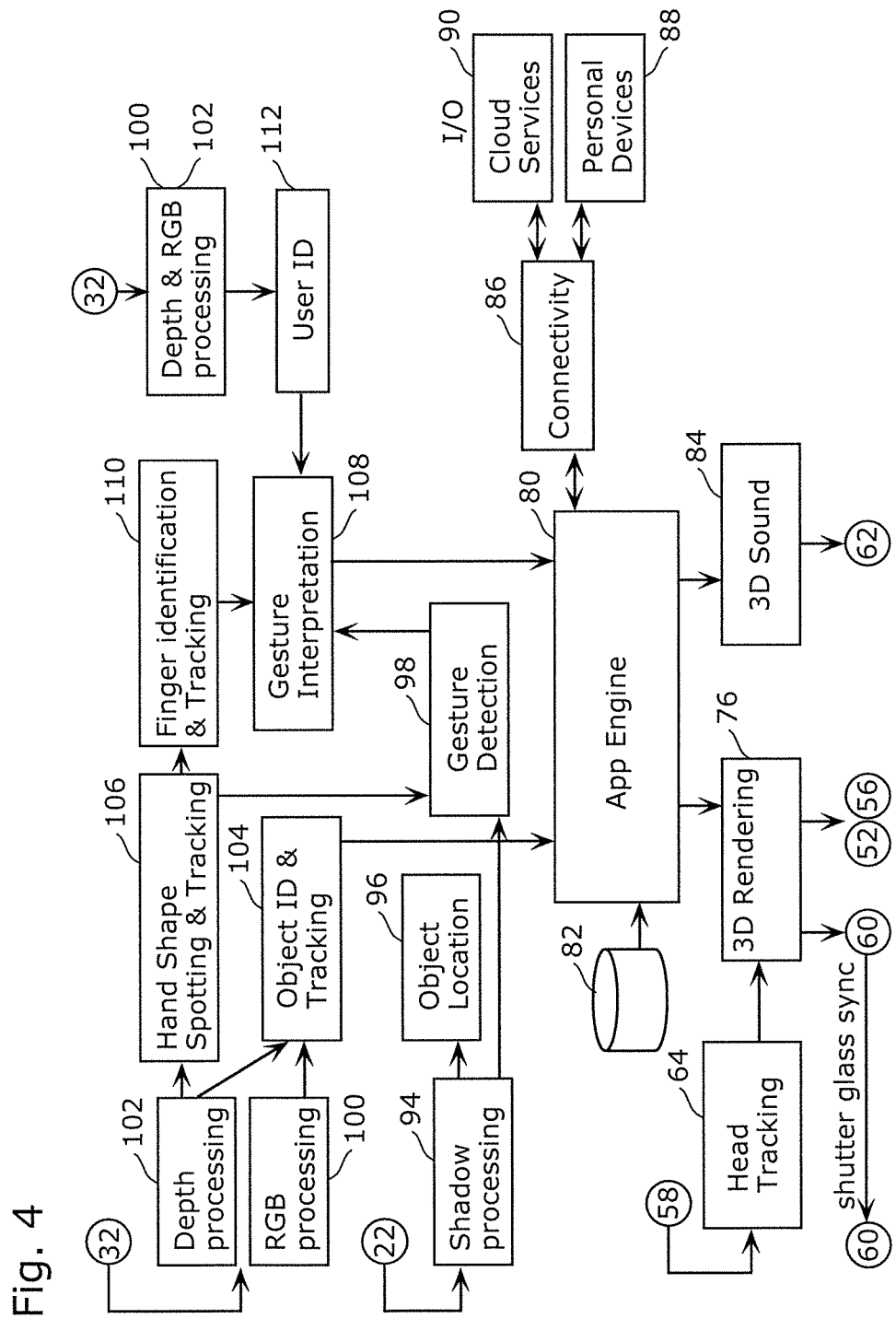
FIG. 4 is a block diagram illustrating how the system software is configured for programming processor(s) to implement the table system of FIG. 2.

With reference to FIG. 4, the functionality of the 3D table system and also of the hybrid tracking system may be implemented by suitably programmed processors or computers. The 3D rendering processor 76 is responsible for rendering the 3D output projected to the user through the 3D projectors 52 and 56. Thus, the 3D rendering processor receiving head tracking information from the head tracking system 64, preferably including both time-stamped location and viewing angle information. The 3D rendering processor supplies the synchronization signal that is fed to the shutter synchronizing circuit 60. The 3D rendering processor is likewise responsible for supplying image information to the respective 3D projectors 52 and 56.

The system further includes main processor 80 which has associated memory or storage 82 and is coupled to the rendering processor 76 and also to the 3D sound system 84 driving speakers 62 (e.g., mounted on frame 46, and disposed within the projection surface frame 72). The main processor 80 is equipped with input/output connectivity circuitry 86 to allow the main processor to communicate with personal devices 88, such as smart phones, tablet computers, personal computers and the like. Connectively, circuitry 86 is also designed to establish communication with network-based cloud services 90. The main processor 80 receives as an input the enhanced tracking output data (as stored in memory 40, FIG. 1) and uses this input to generate reactions to user hand movement and gestural interpretation. The functionality provided by the image processing circuitry 28 and 3D image processing circuitry 36 (FIG. 1) has been illustrated in greater detail in FIG. 4 generally within the dashed region 92. The inputs for this processing functionality comprise the light sensor 22 and the structured light sensor 32, which are both shown in FIG. 4. Shadow processing 94 is performed on the output data from light sensor 22, followed by object location at 96. Both of these processing functions are performed by the image processing circuitry 28 (FIG. 1). The shadow processing 94 operations feed the gesture detection function 98.

The output of structured light sensor 32 is processed by the 3D image processing circuitry 36 (FIG. 1) to process the RGB (red, green, blue) data as at 100 and also to perform depth processing as at 102. The RGB processing supplies information to the object ID and tracking process 104 while the depth processing function provides information to the hand shape, spotting and tracking function 106. The hand shape, spotting and tracking function 106 also supplies input to the gesture detection function 98. In this way, when the shadow detecting system (responding to light sensor 22) and the three-dimensional space detecting system (responding to the structured light sensor 32) mutually detect a moving object within the space 20 (FIG. 1), the gesture detection function 98 triggers the gesture interpretation function 108, which supplies its output to the main processor 80. The gesture interpretation function 108 also utilizes finger identification and tracking information supplied by process 110, which is in turn responsive to the hand shape, spotting and tracking function 106.

To account for the fact that different users may habitually use certain gestures to denote different meanings, the depth and RGB processing functions 100 and 102 may also be processed to extract user identity as at 112. This information is then used by the gesture interpretation function 108.

Figure 5:
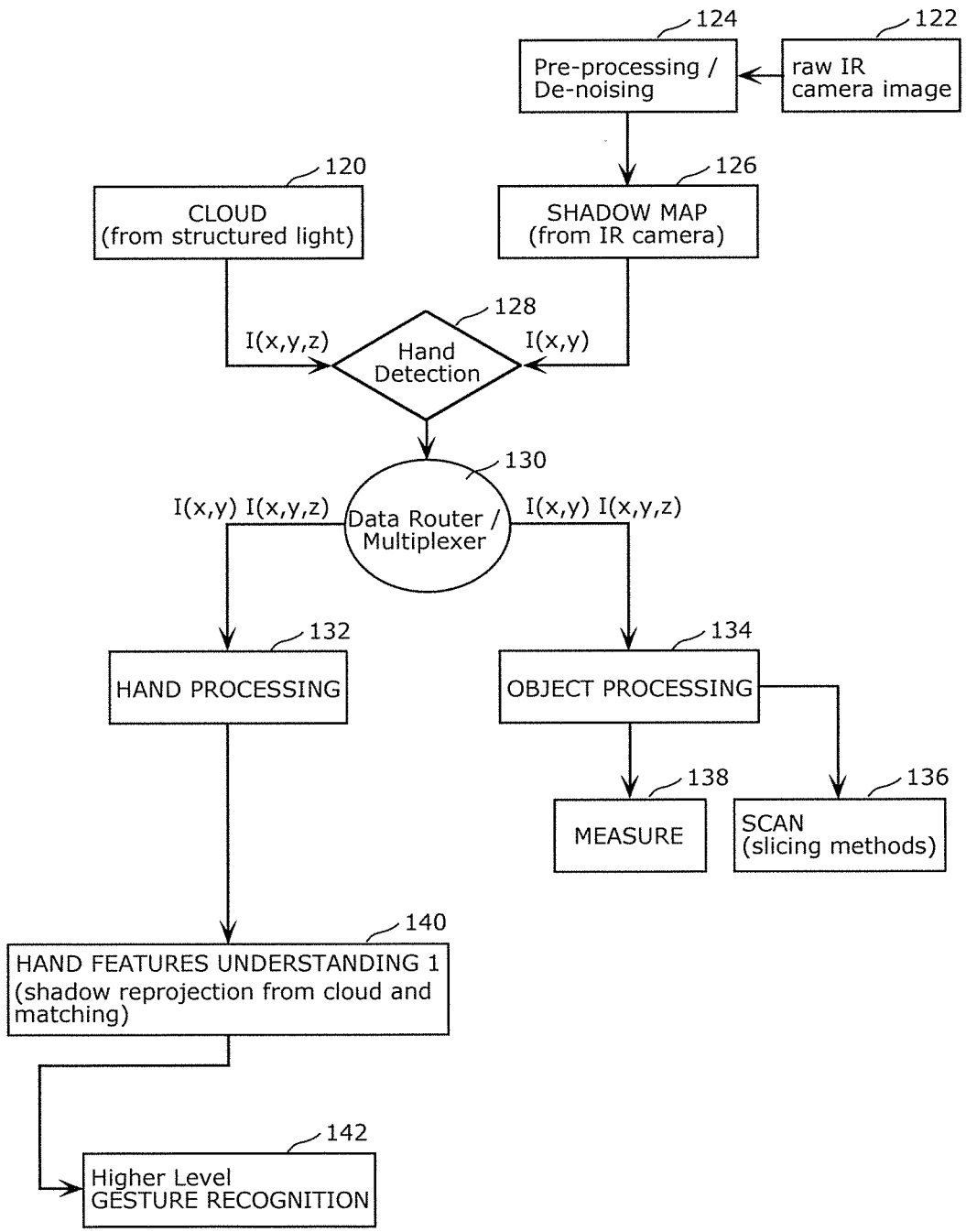
FIG. 5 is a flowchart explaining how the hybrid signal processing is performed to detect objects, such as the user's hand, in three-dimensional space.

Referring now to FIG. 5, an exemplary embodiment of the hybrid process for fusing data from the respective systems to detect and track objects in three-dimensional space will now be described. For purposes of explanation, an infrared (IR) illumination source will be assumed; however, the technique would be essentially the same with other illumination sources. Data obtained from the structured light system (structured light source 30 and structured light sensor 32—see FIG. 1) are depicted at 120. The data may be considered as a point cloud of three-dimensional points in space 20. These data are captured and stored with respect to the intrinsic parameters of the structured light sensor and are converted, if required, to a three-dimensional image space referred to in FIG. 5 as I(x,y,z).

Meanwhile, raw infrared (IR) camera image data from light sensor 22 (FIG. 1) are captured and stored as at 122. The raw image data are preprocessed and de-noised at 124. The preprocessing steps are particularly useful if the light source used for shadow projection is, itself, a structured light source (i.e., the light source 18 of FIG. 1 is eliminated and structured light source 30 serves double duty). In such case a blurring algorithm is used, followed by connected component analysis and selection (to select and retain only objects greater than a predetermined size T). A contour of the selected connected components may be further refined by a sequence of: morphological operators>>blurring>>thresholding to obtain a very smooth contour.

The smooth contour is referenced in FIG. 5 as a shadow map 126. It represents objects' shadows, projected onto the projection surface 16 (FIG. 1) as viewed by light sensor 22. In the embodiment shown in FIG. 2, the light sensor is beneath the surface, thus surface 16 in such embodiment needs to be transparent at the light wavelength being used (e.g., infrared wavelength). The contour represents the location of the shadow in two-dimensional reference frame, referenced in FIG. 5 as I(x,y).

The correlator 34 performs a hand detection algorithm 128 where data from each source is processed. The hand detection algorithm treats each contour as a blob, which the detection algorithm compares with a set of known shapes, including a human hand and other shapes that may be used with the system. The hand detection algorithm may comprise, for example, an artificial intelligence (AI) system employing a Haar transform-based feature classifier trained to recognize hand and non-hand shapes. These training data are stored in a database of shadow maps that are used by the correlator in comparing an input blob (contour) with each entry in the database to determine which shape has matches with the highest likelihood score.

More specifically, the AI expert system applies a set of rules to the potential hand cloud, using a priori knowledge about the hand, such as the average length of a human arm, the average diameter of the palm, the fact that a hand is always attached to an arm that crosses the borders of the camera frame (i.e., hands do not float by themselves in midair).

For best accuracy, the expert system alone may not make a final decision regarding hand and object identification when multiple objects are observed in the space 20. Cloud data alone may not be precise enough to be used as the sole input for feature-based classification algorithms. For this reason, a classifier may be applied to the shadow map. The precision of the hybrid system comes from the combination of the two disparate sensing sources. The shadow map, for example, cannot handle occlusion (where one object in three-dimensional space blocks light from reaching an object below). The cloud data are able to obtain additional data about both objects when occlusion occurs. Also, as previously noted, the resolution of the cloud data may be degraded as the object moves farther from the light source, whereas the shadow data actually become even more precise as the object moves farther from the light source and hence closer to the projection surface.

Based on whether the detected object is a hand or another object, the processing flow splits. This function is performed by the data router/multiplexer 130. The router/multiplexer steers the cloud data I(x,y,z) and shadow map data I(x,y) to the proper processing block, hand processing block 132 or object processing block 134. This routing step may be implemented by storing the respective data I(x,y,z) and I(x,y) in memory and then causing the correlators processor to operate on that data via either the hand processing algorithm or the object processing algorithm.

Figure 6A:
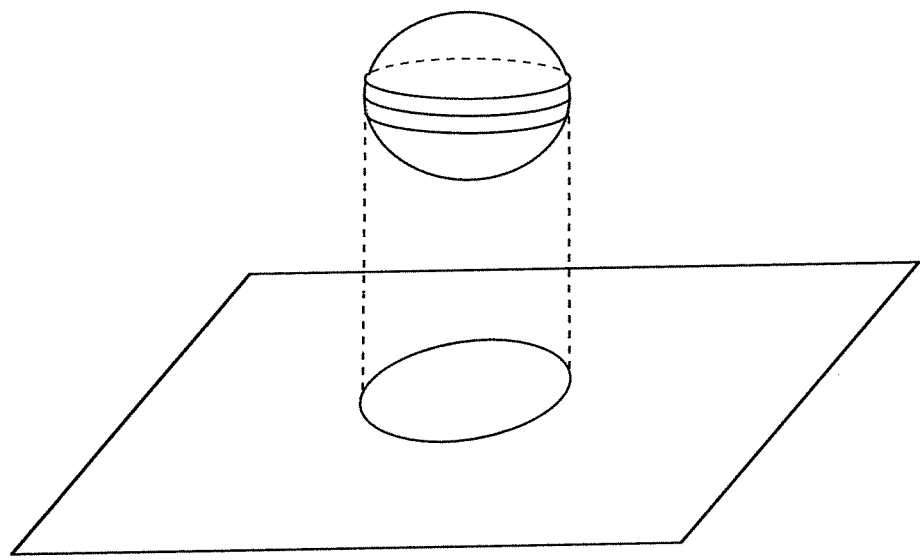
FIG. 6A is a detailed view of the three-dimensional space, illustrating how the correlator performs structured light and projected light data fusion and illustrating.

The hand processing algorithm extracts features such as the center of the palm and the position and direction of the fingers. The algorithm relies on an analysis of the three-dimensional contour obtained by combining the shadow map data and the point cloud data as follows:

As the hand projects a shadow on a surface, such as surface 16, the shadow is treated as a slice of the full hand cloud. The algorithm re-projects the shadow map into the cloud as shown in FIG. 6A. The shadow map contains precise contour information, while the cloud contains valuable 3D information. When re-projecting the shadow map back into the cloud, the algorithm selects a contour (a 3D strip) around the slice, including all the points in the cloud that are closest to the slice. The inclusion/exclusion decision is performed according to a distance threshold from the slice contour. The threshold is computed according to the total error: total error=camera resolution error+structured light system error+re-projection error.

The extracted 3D contour combines the precision of the shadow map contour together with the 3D information of the cloud, particularly the surface normal information extracted from the 3D points. By classifying how the normal vary along the 3D contour, the algorithm differentiates tips of the fingers from valleys between fingers. In this regard, the correlation processor is programmed to identify fingers of a human hand by computing a plurality of geometric normal vectors along the contour of the point cloud and classifying those normal vectors to differentiate between finger tips and valleys between fingers, based on whether a group of adjacent normal vectors diverge (indicative of a tip), or converge (indicative of a valley). The center of the hand is computed as the 3D mean of points belonging to the 3D contour, while the variance gives a rough estimation of the hand being open or closed.

The object processing algorithm is performed over those objects that are not classified as hands. Different processing steps are performed, depending on the objective desired by the user. If the user is interested in scanning an object to obtain the full 3D model, then the slice method scanning algorithm 136 proceeds as follows:

Using the same approach as described for hand processing, the algorithm only considers a subportion of the cloud around the re-projected shadow of the object, whose precision is refined by the cloud itself. We call this sub portion strip. The algorithm captures multiple different ones of these strips from different vantage points, i.e., from different views of the object. Using an iterative closest point algorithm, these multiple strips are matched with high precision until a full dense cloud of the object is captured. The cloud can then be post-processed to obtain a triangulated mesh.

Figure 6B:
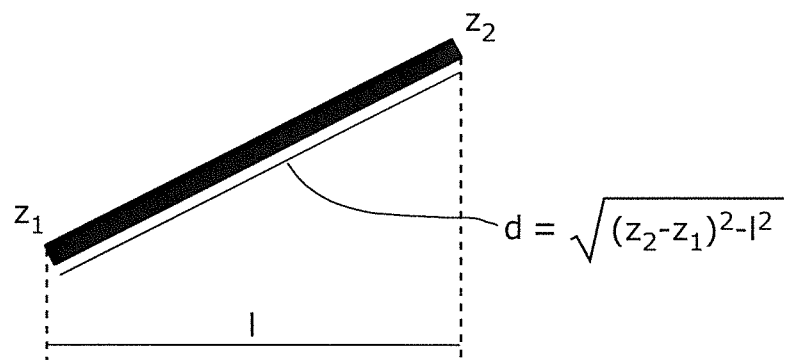
FIG. 6B is a detailed view of the three-dimensional space, illustrating how dimensions within the three-dimensional space may be calculated.

Alternatively, if the user is interested in measuring the objects in real units, the measurement algorithm 138 proceeds as follows:

In determining precise measurements, it must be recognized that a shadow map is only capable of giving the measurements for the projection of the objects on the surface. The cloud is not precise enough to give good measurements, but it can be trusted to yield z-axis information at the extremities of the object, by averaging neighborhood data. The two different types of data so obtained are then combined using a trigonometric relationship as illustrated in FIG. 6B. This is performed by identifying at least two points on the contour of the point cloud that correspond to at least two points associated with the projected image signal. The distances between points on the point cloud and corresponding points associated with the projected image signal are then determined. Finally, using the trigonometric relationship shown in FIG. 6B, the dimension of said object based on the locations of the identified points and on the determined distances is calculated.

If hand processing (132) is performed, additional feature extraction and hand feature understanding (gestural semantic analysis) may be performed as depicted at 140 and 142 in FIG. 5. Some of the possible gestures are described below in connection with FIGS. 8 and 9.

Figure 7:
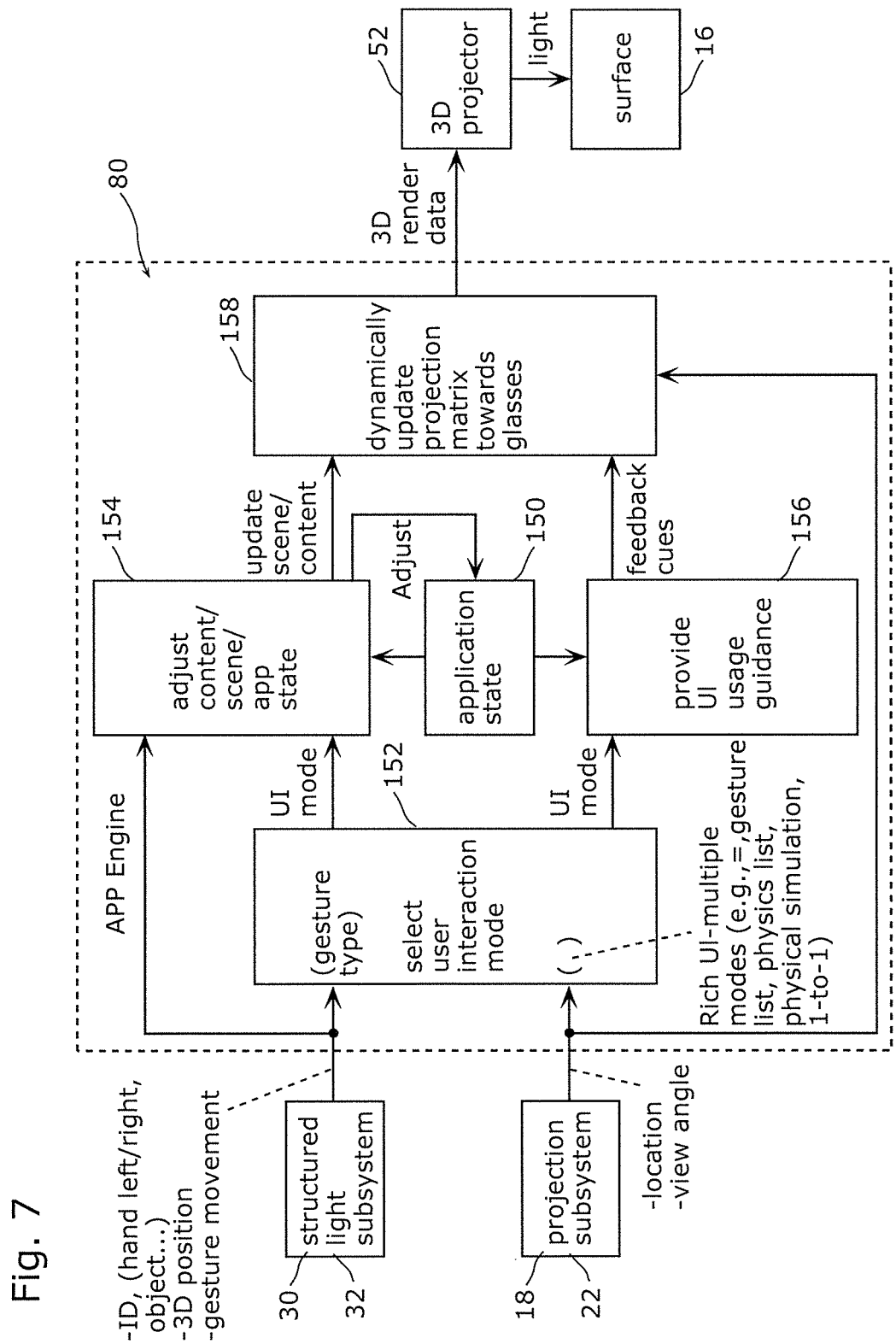
FIG. 7 is a block diagram illustrating how the processor is programmed to perform the application engine functions.

FIG. 7 illustrates how the main processor 80 may be configured to perform the system functions described herein. In FIG. 7 the structured light system comprising structured light source 30 and structured light sensor 32 are depicted diagrammatically; likewise, the projection subsystem comprising light source 18 and light sensor 22 have been depicted diagrammatically. The main processor 80 supplies 3D render data to the 3D projector 52, which projects its image upon surface 16. The main processor 80 is programmed to maintain a data structure that stores the application state, illustrated diagrammatically as data store 150. The 3D render data is dynamically updated in synchronism with the wearers 3D glasses 58 based on the application state and other calculated parameters.

Specifically, the data from the structured light subsystem and from the projection subsystem are processed by processor 80 at block 152 to determine the user interaction mode. In this regard, the structured light subsystem provides data from which the user's "gesture type" is calculated. These data include data indicative of the detected object's identity (e.g., a human hand, left hand or right hand; an object, an object held by a human hand, etc.), data indicative of the object's 3D position and data indicative of any detected gestural movement. The data from the projection subsystem include data indicative of detected object location and view angle.

The processor 80 at block 152 uses these input data to determine what user interface (UI) mode to use in adjusting content and/or scene delivered to the 3D projector and also to adjust the application state maintained by the processor in its memory at data store 150. This functionality is represented by block 154. The UI mode information is also used by processor 80 at block 156 to generate and provide user interface usage guidance to the user, which information is also ultimately fed to the 3D projector 52 after being dynamically updated at block 158 as a projection matrix that takes into account the user's head position as measured by the glasses 58 and head tracking system 64 (FIG. 2).

Figure 8:
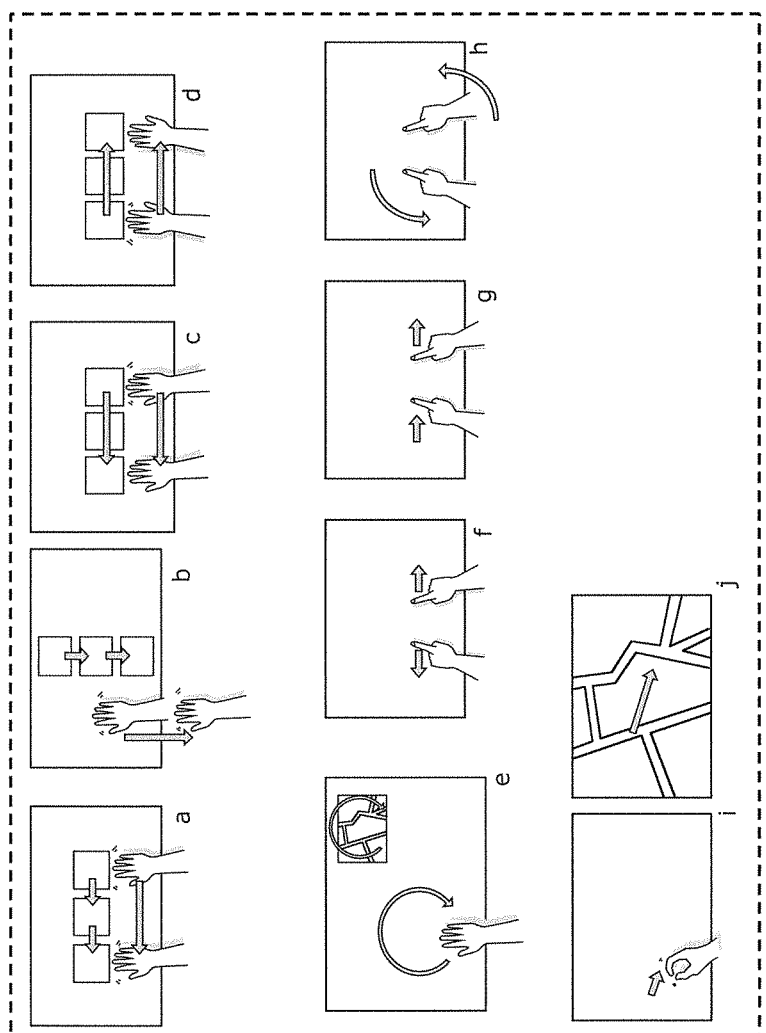
FIG. 8 (comprising FIGS. 8a-8j) depicts various user hand gestural movements that are detectable using the disclosed hand and object tracking system.

FIGS. 8a-8d (collectively part of FIG. 8) depict exemplary two-dimensional binary swipe gestures that might be used, for example, to move a list so as to focus on the next item or a previous item. Specifically, FIG. 8a depicts a sideways gesture while FIG. 8b depicts a vertical gesture. FIGS. 8c and 8d depict two-dimensional continuous swipe gestures that evoke physics-based list interaction where the swipe gesture smoothly scrolls across one or many items in a list, with momentum and decay as well as bouncing and snapping, to simulate the physical movement of physical objects.

FIG. 8e depicts a one-hand, one-to-one direct manipulation where a circular hand motion, for example, produces a corresponding circular motion in the displayed object. FIGS. 8f, 8g and 8h depict two-hand two-dimensional zoom, pan and rotate operations, respectively. In each of these operations, there is a one-to-one direct manipulation of the displayed object.

FIGS. 8i and 8j depict a two-dimensional joystick pinch operation. As shown in FIG. 8i, a pinch of the fingers and a movement of the hand to a desired direction produces a corresponding screen movement as shown in 8j.

Figure 9:
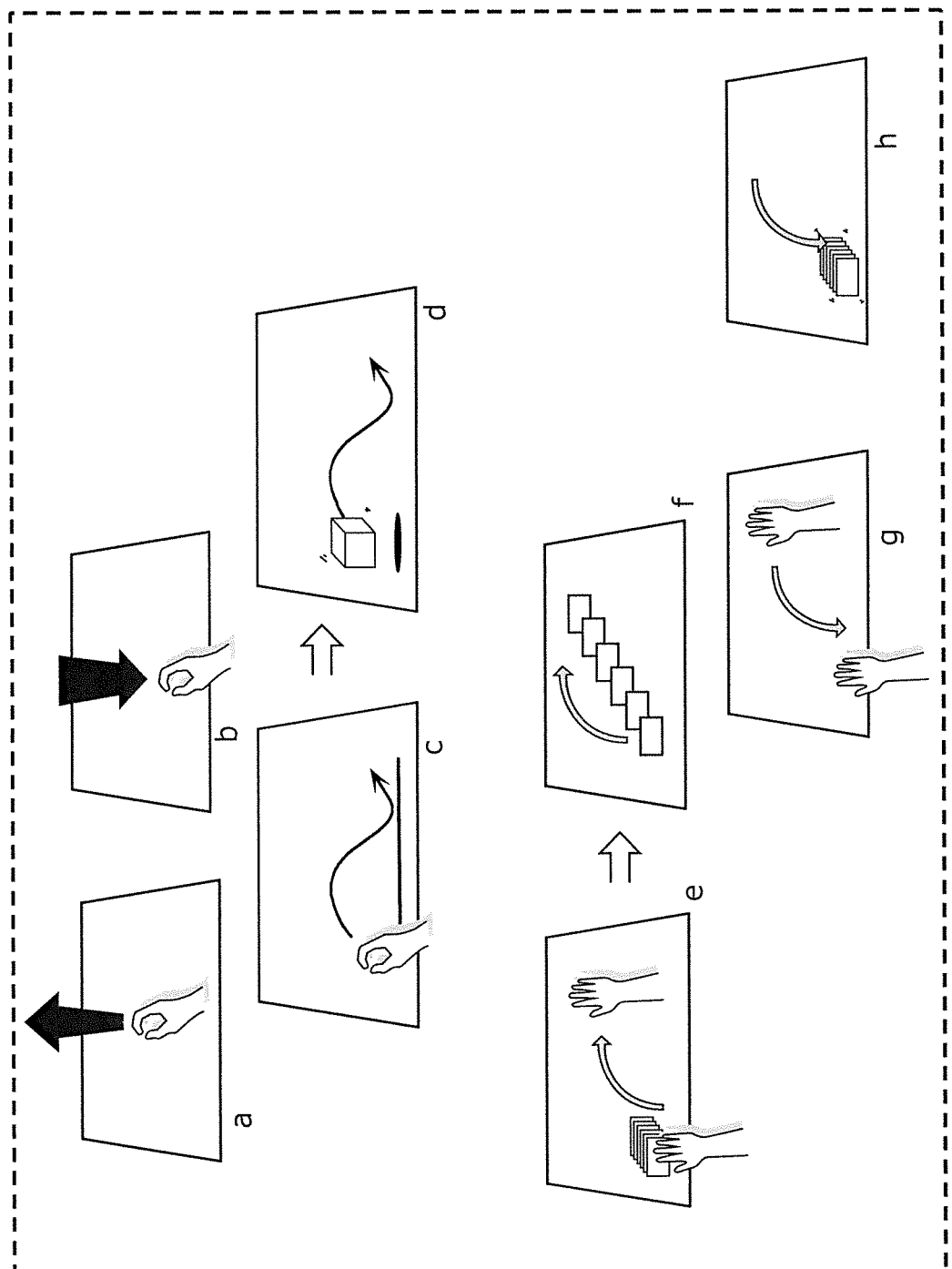
FIG. 9 (comprising FIGS. 9a-9h) depicts additional user hand gestural movements that are detectable using the disclosed hand and object tracking system.

FIGS. 9a-9h (collectively FIG. 9) show further exemplary gestures. FIGS. 9a and 9b illustrate a three-dimensional up/down gesture which might be performed with one or two hands. The up gesture illustrated in FIG. 9a may be used, for example, to enter a virtual building or to pull up a menu or object in virtual space. The down gesture illustrated in FIG. 9b may be used, for example, to close a menu or push down an object in virtual space.

FIGS. 9a and 9b depict a three-dimensional one-to-one direct manipulation of a virtual object in three-dimensional space in a one-to-one mode. In FIG. 9c, the user is grasping and moving a perceived virtual image, causing the virtual image (a cube) to move in three-dimensional space as shown in FIG. 9d.

FIGS. 9e-9f illustrate an exemplary two-dimensional swipe maneuver to perform a gesture-based list interaction. In FIG. 9e, the user moves his or her hand in a swiping motion in reference to a stack of cards displayed on the projection surface. This motion causes the cards to fan out into a spatial array as shown in FIG. 9f. Doing this allows the user to then pick one of the cards for further interaction. FIGS. 9g and 9h show the reverse action whereby a swiping gesture performed at FIG. 9g closes the array of cards from FIG. 9f back to the stacked arrangement as shown in FIG. 9h.

The foregoing description of the non-limiting embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

INDUSTRIAL APPLICABILITY

The disclosure is applicable to a hybrid tracking system that uses both structured light and shadow-projection light to capture position and orientation information.

The invention claimed is:
1. An apparatus for tracking an object in three-dimensional space, comprising:
   a projection surface;
   a light source disposed in spaced relation to said projection surface;

the projection surface and the light source defining there between a volume of space illuminated by said light source;

a light sensor responsive to illumination falling on the projection surface and operative to measure illumination levels over a predefined image plane associated with the light sensor, producing a projected image signal;

a structured light source that projects a structured light within the volume of space;

a structured light sensor adapted to record reflected structured light from objects occupying the volume of space producing a structured light signal; and a correlation processor receptive of the projected image signal and said structured light signal and adapted to compute a hybrid signal indicative of the position of an object within said space.

2. The apparatus of claim 1 wherein said projection surface comprises a translucent layer disposed between said light source and said light sensor.

3. The apparatus of claim 2 wherein said light sensor includes a camera responsive to illumination of said translucent layer.

4. The apparatus of claim 1 wherein said light sensor is embedded in the projection surface.

5. The apparatus of claim 1 wherein the light sensor is integral with the projection surface.

6. The apparatus of claim 1 wherein said structured light sensor produces a structured light signal containing three-dimensional positional information about the object within said space.

7. The apparatus of claim 1 wherein said light sensor produces a projected image signal indicative of a two-dimensional position of a shadow cast by the object within said space.

8. The apparatus of claim 1 wherein said correlation processor is programmed to recognize a human hand based on measured parameters selected from the group consisting of a parameter indicative of the length of a human arm, a parameter indicative of the diameter of a human palm, and data indicative of the presence of a human arm extending outside said space and being connected to a shape representing a potential human hand.

9. The apparatus of claim 1 wherein said correlation processor is programmed to model the structured light signal as a three-dimensional point cloud and further programmed to model the projected image signal as a two-dimensional slice, wherein the correlation processor is programmed to identify a contour around said point cloud that is congruent with the contour of the slice within a predefined tolerance threshold by re-projecting the contour of the slice into the contour of said point cloud.

10. The apparatus of claim 9 wherein the predefined tolerance threshold is computed based on error measures selected from the group consisting of light sensor resolution error, structured light source and structured light sensor system error and re-projection error.

11. The apparatus of claim 9 wherein said correlation processor is programmed to identify fingers of a human hand by computing a plurality of geometric normal vectors along the contour of the point cloud and classifying those normal vectors to differentiate between finger tips and valleys between fingers, based on whether a group of adjacent normal vectors diverge, indicative of a tip, or converge, indicative of a valley.

12. The apparatus of claim 9 wherein said correlation processor is programmed to identify whether a human hand is open or closed by computing the mean and variance of the point cloud and then using the mean to identify the center of the hand and using the variance as a measure of whether the hand is open or closed.

13. The apparatus of claim 9 wherein said correlation processor is programmed to measure a dimension of an object occupying said space by:

identifying at least two points on the contour of the point cloud that correspond to at least two points associated with the projected image signal;

determining the distances between points on the point cloud and corresponding points associated with the projected image signal; and using a trigonometric relationship to calculate the dimension of said object based on the locations of the identified points and on the determined distances.

14. The apparatus of claim 1 wherein said projection surface also functions as an image projection surface.

15. The apparatus of claim 1 wherein the light source and the structured light source share the same illumination source.

16. The apparatus of claim 1 wherein the light source and the structured light source have substantially co-located centers.

17. The apparatus of claim 1 wherein the light source and the structured light source are differentiated from one another based on a property selected from the group consisting of wavelength and temporal multiplexing.

18. The apparatus of claim 1 wherein said structured light source projects structured light that emanates in a diverging pattern that defines a resolution that decreases with increasing distance from the structured light source.

19. A method of extracting information from an object in three-dimensional space, comprising:

projecting structured light into a volume of space and using an electronic sensor to detect and analyze structured light patterns reflected from an object within said space to produce and store structured light data;

projecting light onto a projection surface from a vantage point such that the object casts a shadow on said surface; using a light sensor to detect and analyze the cast shadow to produce and store projected image data; and using a processor to correlate the structured light data and the projected image data and to generate a hybrid signal indicative of the position of the object within said space.

20. The method of claim 19 further comprising:

analyzing the structured light data and the projected image data to recognize the object as a human hand based on measured parameters selected from the group consisting of a parameter indicative of the length of a human arm, a parameter indicative of the diameter of a human palm, and data indicative of the presence of a human arm extending outside said space and being connected to a shape representing a potential human hand.

21. The method of claim 19 further comprising modeling the structured light data as a three-dimensional point cloud and further modeling the projected image signal as a two-dimensional slice, wherein the correlating step is performed by identifying a contour around said point cloud that is congruent with the contour of the slice within a predefined tolerance threshold by re-projecting the contour of the slice into the contour of said point cloud.

22. The method of claim 21 wherein the predefined tolerance threshold is computed based on error measures selected from the group consisting of light sensor resolution error, structured light source and structured light sensor system error and re-projection error.

23. The method of claim 19 further comprising analyzing the structured light data and the projected image data to identify fingers of a human hand by computing a plurality of geometric normal vectors along a contour of a point cloud defined by the structured light data and classifying those normal vectors to differentiate between finger tips and valleys between fingers, based on whether a group of adjacent normal vectors diverge, indicative of a tip, or converge, indicative of a valley.

24. The method of claim 19 further comprising analyzing the structured light data and the projected image data to identify whether a human hand is open or closed by computing the mean and variance of the point cloud and then using the mean to identify the center of the hand and using the variance as a measure of whether the hand is open or closed.

25. The method of claim 19 further comprising measuring a dimension of an object occupying said space by:
  identifying at least two points on the contour of the point cloud that correspond to at least two points associated with the projected image signal;
  determining the distances between points on the point cloud and corresponding points associated with the projected image signal; and
  using a trigonometric relationship to calculate the dimension of said object based on the locations of the identified points and on the determined distances.

* * * * *